US008168283B2

(12) United States Patent
Liggett

(10) Patent No.: US 8,168,283 B2
(45) **Date of Patent: *May 1, 2012**

(54) HIGHLY REFLECTIVE MATERIALS FOR USE AS LOGOS AND/OR IDENTIFICATION

(75) Inventor: Paul E. Liggett, Wooster, OH (US)

(73) Assignee: Lockheed Martin Corporation, Bethesda, MD (US)

( * ) Notice: Subject to any disclaimer, the term of this patent is extended or adjusted under 35 U.S.C. 154(b) by 678 days.

This patent is subject to a terminal disclaimer.

(21) Appl. No.: 12/039,985

(22) Filed: Feb. 29, 2008

(65) Prior Publication Data

US 2009/0220740 A1 Sep. 3, 2009

(51) Int. Cl.
*B32B 3/10* (2006.01)
*B32B 27/00* (2006.01)
*B32B 27/06* (2006.01)

(52) U.S. Cl. ................ 428/77; 244/24; 244/29; 428/98; 428/141

(58) Field of Classification Search .................... 428/77, 428/141, 195, 98
See application file for complete search history.

(56) References Cited

U.S. PATENT DOCUMENTS

| | | | | |
|---|---|---|---|---|
| 5,223,357 | A * | 6/1993 | Lovison | 430/1 |
| 6,110,565 | A * | 8/2000 | Matthews | 428/156 |
| 6,979,479 | B2 | 12/2005 | Lavan et al. | |
| 2004/0180161 | A1* | 9/2004 | Lavan et al. | 428/35.7 |
| 2006/0192054 | A1* | 8/2006 | Lachenmeier | 244/145 |
| 2007/0238381 | A1* | 10/2007 | Brewer et al. | 442/149 |
| 2007/0281570 | A1* | 12/2007 | Liggett et al. | 442/378 |

* cited by examiner

*Primary Examiner* — Brent Ohern
(74) *Attorney, Agent, or Firm* — James C. Scott; Roetzel & Andress

(57) ABSTRACT

The present invention is generally directed to tapes or laminates designed for use in conjunction with lighter-than-air vehicles, platforms or other inflated structures. In one embodiment, the present invention is directed to tapes or laminates designed for use in logos and/or identification numbers that can be, for example, used on a lighter-than-air vehicle, platform or other inflated structure. In another embodiment, the present invention is directed to tapes or laminates that include, among other layers, at least one dichroic layer designed to produce a logo, letter and/or number that can be, for example, used on a lighter-than-air vehicle, platform or other inflated.

15 Claims, 4 Drawing Sheets

HIGHLY REFLECTIVE MATERIALS FOR USE AS LOGOS AND/OR IDENTIFICATION

FIELD OF THE INVENTION

The present invention is generally directed to tapes or laminates designed for use in conjunction with lighter-than-air vehicles, platforms or other inflated structures. In one embodiment, the present invention is directed to tapes or laminates designed for use in logos and/or identification numbers that can be, for example, used on a lighter-than-air vehicle, platform or other inflated structure. In another embodiment, the present invention is directed to tapes or laminates that include, among other layers, at least one highly reflective metallic layer and/or one dichroic film layer designed to produce a logo, letter and/or number that can be, for example, used on a lighter-than-air vehicle, platform or other inflated structure.

BACKGROUND OF THE INVENTION

Lighter-than-air vehicles, such as aerostats, blimps, balloon, dirigibles, or airships, are used in many different applications, such as near large sporting, entertainment or cultural events, or in large metropolitan areas to provide advertising or to provide high level coverage of the events. Lighter-than-air vehicles are also used in high altitude applications, for the purpose of weather monitoring and/or military surveillance. In such instances, the higher a vehicle can operate translates into an increased amount of area that can be viewed for surveillance purposes and/or weather monitoring. Additionally, lighter-than-air vehicles that possess the ability to operate at altitudes above 50,000 feet are not a hazard to commercial air traffic, are more difficult to detect and/or destroy, can be used for the surveillance of wide areas, and thus can provide a strategic and/or economic advantage.

Typically, high altitude lighter-than-air vehicles are made from laminates of materials that withstand a wide range of temperature variation, ozone degradation, exposure to ultraviolet light and daily expansion and contraction due to the wide temperature variations.

U.S. Pat. No. 6,979,479 teaches a laminate of a liquid crystal polymer fiber yarn layer (VECTRAN®) as an interior surface, an adhesive layer, a polyimide layer, and a polyvinylidene fluoride (PVDF) layer which forms the exterior surface. The polyimide layer functions as a gas barrier for retaining helium or hydrogen. The polyvinylidene fluoride layer provides ozone and ultraviolet light protection.

With regard to fabrics for lighter-than-air vehicles operating at high altitudes it is also typical to have a thin metal coating as one of the layers to reflect most of the incident solar radiation, reduce helium permeation, minimize the effects of lightening strikes, and provide a means for uniform static electric distribution over the hull surface Given the above, providing logos and/or identification letter and/or numbers for lighter-than-air vehicles can be a problem since such logos, letters and/or numbers must provide identification without significantly affecting the local thermal management properties of the materials used to form the hull portion of such lighter-than-air vehicles. The use of dark letters for contrast is not satisfactory since they will allow localized heat accumulation.

SUMMARY OF THE INVENTION

The present invention is generally directed to tapes or laminates designed for use in conjunction with lighter-than-air vehicles, platforms or other inflated structures. In one embodiment, the present invention is directed to tapes or laminates designed for use in logos and/or identification numbers that can be, for example, used on a lighter-than-air vehicle, platform or other inflated structure. In another embodiment, the present invention is directed to tapes or laminates that include, among other layers, at least one highly reflective metallic layer and/or one dichroic film layer designed to produce a logo, letter and/or number that can be, for example, used on a lighter-than-air vehicle, platform or other inflatable.

In one embodiment, the present invention relates to a tape comprising: a first layer, the first layer being formed from at least one adhesive composition and where the first layer has an upper surface and a lower surface; a second layer, where the second layer has an upper surface and a lower surface and the lower surface of the second layer is oriented toward the upper surface of the first layer and the second layer is designed to reflect and/or distort at least one wavelength of light; and a third layer, the third layer being formed from one or more UV-resistant polymer compositions, where the third layer has an upper surface and a lower surface and the lower surface of the third layer is oriented toward the upper surface of the second layer.

In another embodiment, the present invention relates to a tape comprising: a first layer, the first layer being formed from at least one adhesive composition and where the first layer has an upper surface and a lower surface; and a second layer, where the second layer has an upper surface and a lower surface and the lower surface of the second layer is oriented toward the upper surface of the first layer and the second layer is designed to reflect and/or distort at least one wavelength of light.

DETAILED DESCRIPTION OF THE INVENTION

The present invention is generally directed to tapes or laminates designed for use in conjunction with lighter-than-air vehicles, platforms or other inflated structures. In one embodiment, the present invention is directed to tapes or laminates designed for use in logos and/or identification numbers that can be, for example, used on a lighter-than-air vehicle, platform or other inflated structure. In another embodiment, the present invention is directed to tapes or laminates that include, among other layers, at least one highly reflective metallic layer and/or one dichroic film layer designed to produce a logo, letter and/or number that can be, for example, used on a lighter-than-air vehicle, platform or other inflated.

In the specification of the present invention, when the term lighter-than-air vehicle is utilized, such a term covers all types of lighter-than-air vehicles, platforms or other inflated structures. Additionally, when used herein, the terms tape and/or laminate are interchangeable in the present specification and claims.

Figure 1:
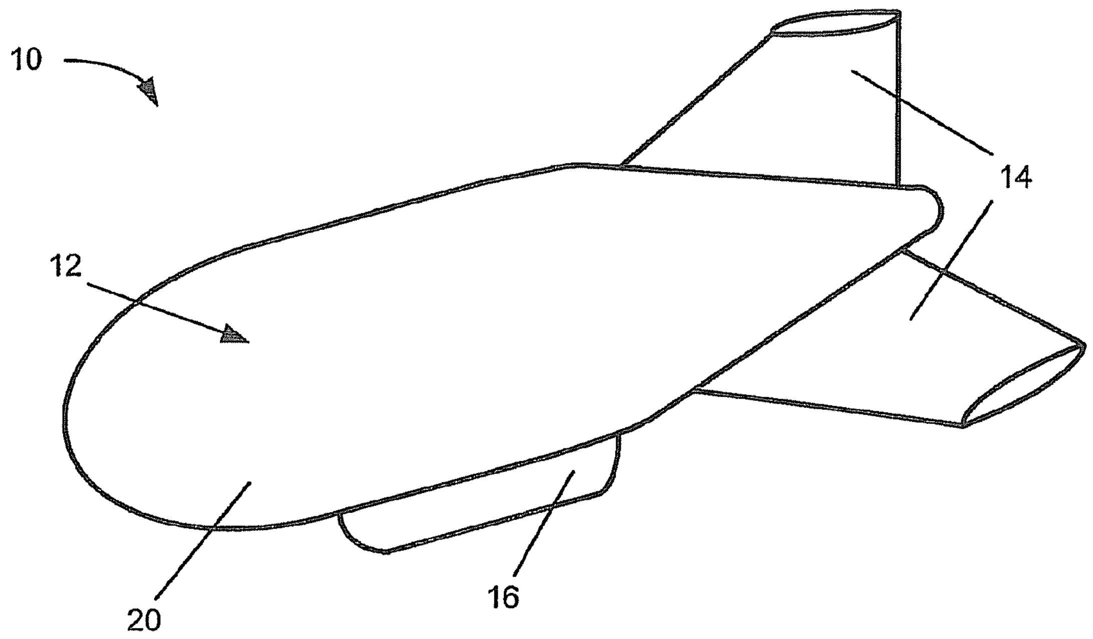
FIG. 1 is a perspective drawing of a lighter-than-air vehicle according to the present invention.

Referring now to the drawings and in particular to FIG. 1, FIG. 1 illustrates one example of a lighter-than-air vehicle 10. Although vehicle 10 is illustrated as a lighter-than-air vehicle, it will be appreciated that the present invention is directed to a flexible laminate construction that is applicable to any lighter-than-air vehicle, platform, or other inflated structure, such as an aerostat, a blimp, an airship, a balloon, or any floating object that is tethered or un-tethered. Vehicle 10 includes a hull 12 with no fins and at least one stabilizing fin 14. Although hull 12 is shown as having an oblong configuration, it will be appreciated that any shape—sphere, ellipse, parabolic, teardrop, etc.—can be used. Vehicle 10 can carry a payload 16.

In one embodiment the present invention relates to a tape, laminate or flexible laminate construction that can be used in any application where logos, identification letters and/or identification numbers are needed, irrespective of the intended end-use for the tape-containing structure.

The tape, laminate or flexible laminate constructions of the present invention are made of thin, low weight materials that do not significantly contribute to the weight of lighter-than-air vehicles. The combination of the materials utilized in a tape, laminate or flexible laminate construction in accordance with the present invention are flexible and can withstand wide temperature variations. In one embodiment, such temperature variations range anywhere from about −90° C. to about +70° C.

In one embodiment, vehicle 10 is constructed from a combination of hull material and flexible laminate seaming material/tape. In another embodiment, some other means of joining sections of hull material is used to form vehicle 10 (e.g., stitching, heat sealing, etc.), and the seaming material/tape is used to reduce and/or eliminate gas leakage at the seam lines present in hull 12. In either instance, a flexible laminate seam cover construction (e.g., a seaming material/tape) can be used to seal, cover, and protect one or more of the exterior gaps located between one or more fabric panels or sections (e.g., hull sections). Such external seam cover tapes are known in the art.

In another embodiment, the logo/numbering tape, laminate or flexible laminate constructions of the present invention are designed to provide contrasting color, reflection and/surface texture on the panels or sections (e.g., hull sections) that form the hull of vehicle 10 without significantly affecting local thermal management properties. Additionally, the tape, laminate or flexible laminate constructions of the present invention have a number of desirable properties. In general, such properties include, but are not limited to, resistance to ultraviolet light, ozone resistance, high strength; light weight, and the ability to withstand extreme temperature and pressure variations. In view of the temperature variations and moderate hull strain (stretching) experienced by high altitude lighter-than-air vehicles, the tape, laminate or flexible laminate constructions of the present invention need to remain flexible and adhere to the hull sections.

It is also desirable that, in one embodiment, the logo/numbering tape, laminate or flexible laminate constructions of the present invention be ozone and ultraviolet light resistant, adhere to the hull structure under all temperature conditions and not significantly affect the local thermal management properties. In still another embodiment, it is desirable for the tape, laminate or flexible laminate constructions of the present invention to have high altitude capabilities. The constructions presented herein allow vehicle 10 to operate at altitudes of up to about 80,000 feet.

Figure 2:
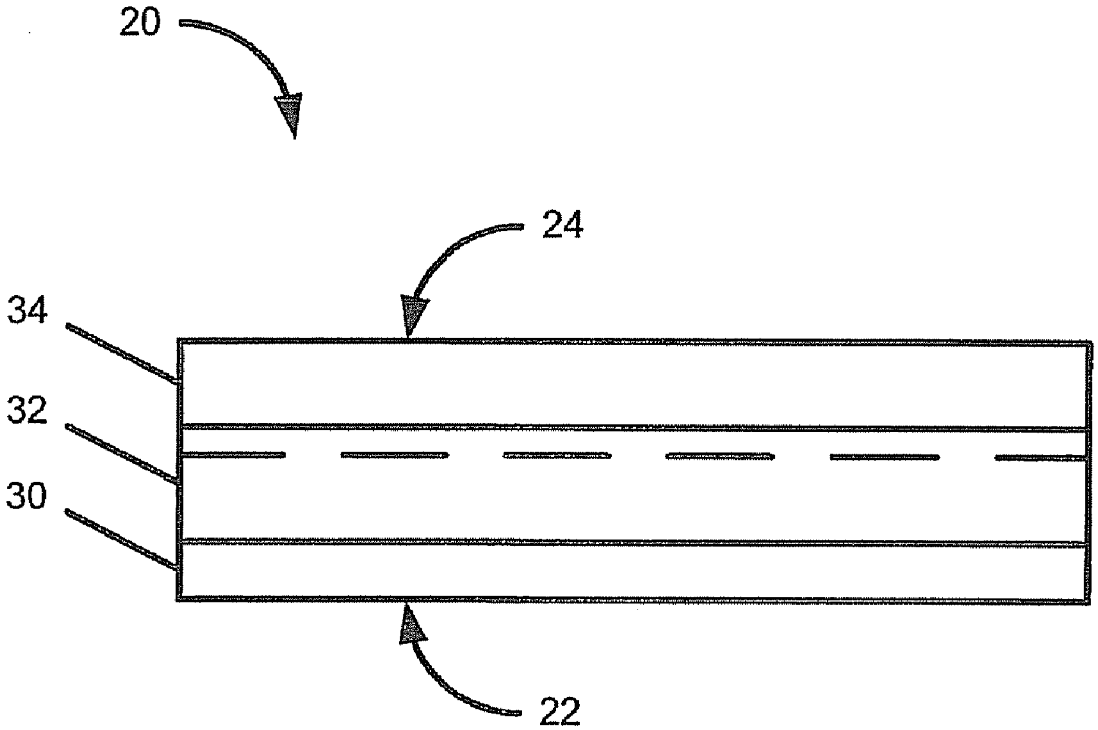
FIG. 2 is a cross-sectional drawing of a tape in accordance with one embodiment of the present invention.

As seen in FIG. 2, in one embodiment a tape, laminate or flexible laminate construction of the present invention is designed to provide logos, identification letters and/or identification numbers for use on a vehicle 10. As illustrated in FIG. 2, tape 20 comprises has an interior surface 22 and an exterior surface 24. In this embodiment, tape 20 is formed from layers which permits/allows tape 20 to act as a logo or some form of identification for use, or placement, on one or more hull sections/panels on a lighter-than-air vehicle. In the embodiment of FIG. 2, tape 20 comprises at least one adhesive layer 30, at least one highly reflective metal-coated polyimide layer 32, which functions as a light reflecting, or wavelength modifying, layer and at least one fluorescent polyvinylidene fluoride (PVDF) layer 34, which protects the metal coating from damage and is resistant to ozone and UV-light. The fluorescence of the PVDF layer 34 is created by the addition of one or more commercial optical brighteners, known in the art, and is used as an inspection aid to ensure continuous coverage of the PVDF layer over the metal coated polyimide layer 32. Useful, reflective metals include, but are not limited to, aluminum, silver, copper, platinum, gold, and their alloys, or particles coated with these metals or their alloys.

Specifically, with regard to metal sub-layer of layer 32, this layer can, in one embodiment, be replaced by a dichroic layer or film. Such dichroic layers and films are known in the art and a detailed description herein is omitted for the sake of brevity. In still another embodiment, metal sub-layer of layer 32 can be replaced by a laser etched aluminized layer that is designed to act as a multiple diffraction grating. In still yet another embodiment, metal sub-layer of layer 32 can be replaced by a suitable polymer layer that is partially loaded with a reflective pigment (e.g., titanium dioxide, silver, gold, copper, or aluminum particles, and other reflective particles, or other blends of these metal particles and other reflective particles).

In one embodiment, the layers of tape 20 can be bonded directly to one another, or can be bonded to each other via one or more intervening adhesive layers (not shown). In one embodiment, one or more adhesive layers are used to join and/or bond the layers of tape 20. In this instance, the present invention is not limited to any particular adhesive. Rather, any adhesive material can be used so long as it retains flexibility at temperatures as low as −80° C. to −90° C. Additionally, the adhesive layers discussed above can also be hydrophobic. That is, the polyurethane material is designed to repel water so as to preclude the absorption of any moisture into tape 20 that may penetrate the surface layer or layers of tape 20. Furthermore, the adhesives can also be selected so as to withstand the temperatures that vehicle 10 is subjected to at altitude during daytime operations.

Figure 4:
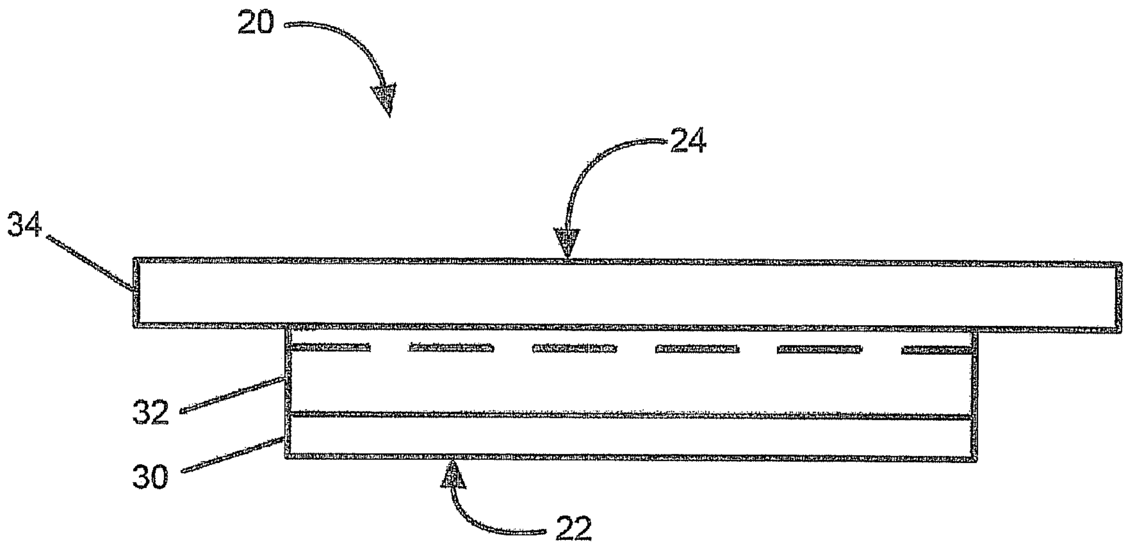
FIG. 4 is a cross-sectional drawing of a tape in accordance with another embodiment of the present invention.

In another embodiment, shown in FIG. 4, PVDF layer 34 is made 0.125 to 1.50 inches wider than the reflective metal containing polyimide layer 32. The wider PVDF layer can be heat sealed into the protective PVDF layer on lighter-than-air fabric hull material panels. This seals the logo/numbering tape into hull material surface and prevents peeling or loosening of the tape over several years under severe operational conditions.

Additionally, the thickness of layers 30, 32, and/or 34 are not critical. Since tape 20 will be used on a lighter-than-air vehicle, it is important that the least amount of material necessary be employed in tape 20 in order to minimize the weight added by tape 20 to, for example, vehicle 10. For example, a metal coated 0.3 mil to 1.0 mil polyimide layer can be joined to a 0.2 mil to 0.6 mil fluorescent PVDF layer, and these layers joined to a 1.0 to 2.0 mil clear outer PVDF layer. The inner adhesive layer can be about 1.0 to 4.0 mil thick and may be of any type, such as pressure sensitive, thermoplastic, or thermoset adhesive, as long as the logo/numbering tape, laminate, or flexible laminate constructions of the present invention remain bonded or sealed to the lighter-than-air vehicle hull material panels. For the adhesive system, materials having tackiness at or around room temperature, i.e., pressure-sensitive adhesives, and thermoplastic materials which manifest their adhesion upon heating, i.e., heat sensitive adhesives, are exemplary. Such materials which are capable of heat curing are similarly usable in the invention.

In one embodiment, the present invention can utilize one or more adhesion promoters. Suitable adhesion promoters for use in the present invention include, but are not limited to, aminoalkyl silanes, methacryloxy silanes, acryloxy silanes, isocyanurates, allyl isocyanurates, fumarates, succinates, maleates, alkoxy silanes, epoxy silanes, allylic alcohols, metal alkoxides, mercaptoalkyl silanes, allyl glycidyl ethers, silyl phosphates, bis(3-trimethoxysilylpropyl) fumarate and combinations of two or more thereof. In the instance where an adhesion promoter is used in conjunction with the present invention, such an adhesion promoter should be chosen so as not to deactivate any hydrosilylation catalyst employed in the present invention. If present, the amount of the adhesion promoter present in the formulations of the present invention ranges from about 0.001 to about 5 weight percent.

In one embodiment, the multilayer tapes of the present invention have a construction in which one or more layers of a thermoplastic polymer composition are present in the tape construction. In one instance, there is at least one thermoplastic polymer composition layer that contains at least one electrically conductive material incorporated therein, and at least one thermoplastic polymer composition layer that contains no electrically conductive material incorporated therein. In one embodiment, the one or more conductive fiber or particle-containing layer or layers make up about 10 to about 90% of the thickness, or even about 30 to about 60% of the thickness, to achieve a good balance of strength and conductivity.

In one embodiment, the highly reflective metal coated polyimide film layer 32 is formed from KAPTON® or an equivalent material with a coating of vacuum deposited aluminum or silver. In this embodiment, polyimide layer 32 is an excellent gas barrier material that contains and/or holds in the lighter-than-air material (e.g., helium, hydrogen, etc.) that is located within the hull of a lighter-than-air vehicle. Unfortunately, the polyimide materials suitable for use in the present invention tend to break down easily in the presence of ultraviolet light. The gas barrier film material is not limited to KAPTON® or equivalent polyimide materials. Nylon, Vectra® polyethylene terephthalate, and polyethylene naphthalate films may also be used for helium retention, but each material is susceptible to ultra violet light and ozone exposure to various degrees. The helium barrier properties of each of these materials can be significantly increased by the addition of thin metal films (i.e., the thermal management coatings discussed earlier) on one or both sides of the films. The metal coatings on film layer 32 also protect the film from ozone and UV-light. PVDF layer 34 is placed on top of, joined, or laminated to polyimide layer 32 to provide protection fro the metal coating and enhances thermal control of the vehicle. PVDF layer 34 is also resistant to ozone and UV-light.

In another embodiment, a three-layer tape according to the present invention optionally has an inner layer of a thermoplastic polymer composition that is at least substantially free of conductive particles located between two outer layers of conductive polymer compositions. In this embodiment, the inner layer makes up about 40 to about 60 percent of the overall thickness of the tape, and each outer layer makes up about 20 to about 30 percent of the overall thickness of the tape. For most applications, outer layer thicknesses in such a configuration are about equal. Overall thickness for multilayer tapes ranges from about 30 to about 200 microns, although thicker tapes are also within the scope of the present invention and are desirable for some applications.

Figure 3:
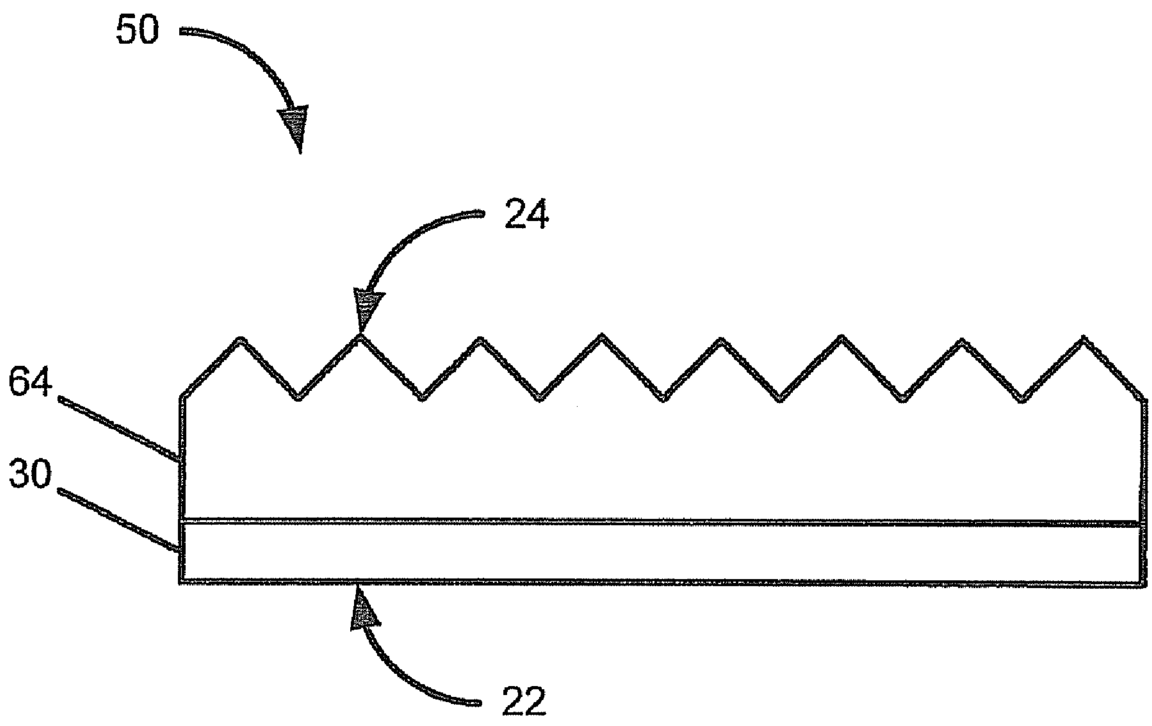
FIG. 3 is a cross-section drawing of a tape in accordance with another embodiment of the present invention

Turning to FIG. 3, tape 50 comprises an interior surface 22 and an exterior surface 24. In this embodiment, tape 50 is formed from layers which permit/allow tape 50 to act as a logo or some form of identification for use, or placement, on one or more hull sections/panels on a lighter-than-air vehicle. In the embodiment of FIG. 3, tape 50 comprises at least one adhesive layer 30 and at least one textured polyvinylidene fluoride (PVDF) layer 64, which besides providing ozone and UV-light protection, acts to change the local reflectivity of a hull section of vehicle 10 to which tape 50 is applied. This in turn permits tape 50 to act as a logo or identification tape. With regard to layer 30, this layer is as described with regard to the embodiment of FIG. 2.

Additionally, layer 64 is not limited to just the pattern shown in FIG. 3. Any suitable pattern can be used, so long as the pattern changes the local reflectivity of the hull sections to which tape 50 is attached.

As with the embodiment of FIG. 2, the layers of the embodiment of FIG. 3 can be bonded directly to one another, or can be bonded to each other via one or more intervening adhesive layers as is described above with regard to the embodiment of FIG. 2.

Additionally, the thickness of layers 30 and/or 64 are not critical. Since tape 50 will be used on a lighter-than-air vehicle, it is important that the least amount of material necessary be employed in tape 50 in order to minimize the weight added by tape 50 to, for example, vehicle 10. For example, adhesive layer 30 can be about 1.0 to 2.0 mil and textured clear PVDF layer 64 can be 1.0 to 2.0 mil.

In another embodiment, tape 50 can be coated with a pressure sensitive adhesive material containing particulate material which imparts conductivity and/or improves conductivity as is described above with regard to the embodiment of FIG. 2. In one embodiment, the embodiment of FIG. 3 can utilize one or more adhesion promoters as is described above with regard to the embodiment of FIG. 2.

In still another embodiment, a fabric textured surface may be achieved as the surface of a logo/numbering tape by fusing a clear PVDF tape into the surface of the PVDF coated hull fabric material, eliminating the need for adhesive layer 30.

Multilayer films/tapes in accordance with the present invention can be formed by any suitable technique, such as extrusion coating, extrusion laminating or other laminating processes, co-extrusion and thermal or adhesive bonding of separate film layers. Single layer films prepared by various methods, such as the calender method, extrusion and casting, also can be laminated to other films with adhesives or by application of heat and pressure or they can be coated to form multilayer films.

Although the invention has been described in detail with particular reference to certain embodiments detailed herein, other embodiments can achieve the same results. Variations and modifications of the present invention will be obvious to those skilled in the art, and the present invention is intended to cover in the appended claims all such modifications and equivalents.

What is claimed is:

1. A tape comprising:

a tape having three layers, wherein the tape is one or more logos and/or indicia on a hull section of a lighter-than-air vehicle;

a first layer, the first layer being formed from at least one adhesive composition and where the first layer has an upper surface and a lower surface;

a second layer, where the second layer has an upper surface and a lower surface and the lower surface of the second layer is oriented toward and in contact with the upper surface of the first layer and the second layer is designed to reflect and/or distort at least one wavelength of light; and a third layer, the third layer being formed from one or more UV-resistant polymer compositions, where the third layer has an upper surface and a lower surface and the lower surface of the third layer is oriented toward and in contact with the upper surface of the second layer.

2. The tape of claim 1, wherein the first layer is formed from at least one silicone-based adhesive.

3. The tape of claim 1, wherein the second layer is formed from at least one polyimide composition.

4. The tape of claim 1, wherein the third layer is formed from one or more polyvinylidene fluorides.

5. The tape of claim 1, wherein the third layer extends beyond the second layer.

6. The tape of claim 4, wherein the polyvinylidene fluoride third layer contains an optical brightener and fluoresces under ultraviolet light.

7. The tape of claim 5, wherein a portion of the third layer that extends beyond the second layer can be heat sealed or fused into a polyvinylidene fluoride coating on the surface of lighter-than-air vehicle hull panels.

8. The tape of claim 1, where in the second layer contains a reflective metal sub-layer.

9. The tape of claim 1, where in the second layer contains at least one type of reflective particles.

10. The tape of claim 1, wherein the second layer contains a dichroic sub-layer.

11. A tape comprising:

a tape having two layers, wherein the tape is one or more logos and/or indicia on a hull section of a lighter-than-air vehicle;

a first layer, the first layer being formed from at least one adhesive composition and where the first layer has an upper surface and a lower surface; and a second layer, where the second layer has an upper surface and a lower surface and the lower surface of the second layer is oriented toward and in contact with the upper surface of the first layer and the second layer is designed to reflect and/or distort at least one wavelength of light.

12. The tape of claim 11, wherein the first layer is formed from at least one silicone-based adhesive.

13. The tape of claim 11, wherein the second layer is formed from one or more polyvinylidene fluorides.

14. The tape of claim 11, wherein the second layer is a textured polyvinylidene fluoride layer designed to reflect or distort at least one wavelength of light.

15. The tape of claim 11, wherein the second layer can be heat sealed or fused into a polyvinylidene fluoride coating on the surface of lighter-than-air vehicle hull panels.

* * * * *